(No Model.)
J. W. WALKER.
COTTON BASKET.
No. 338,892.  Patented Mar. 30, 1886.
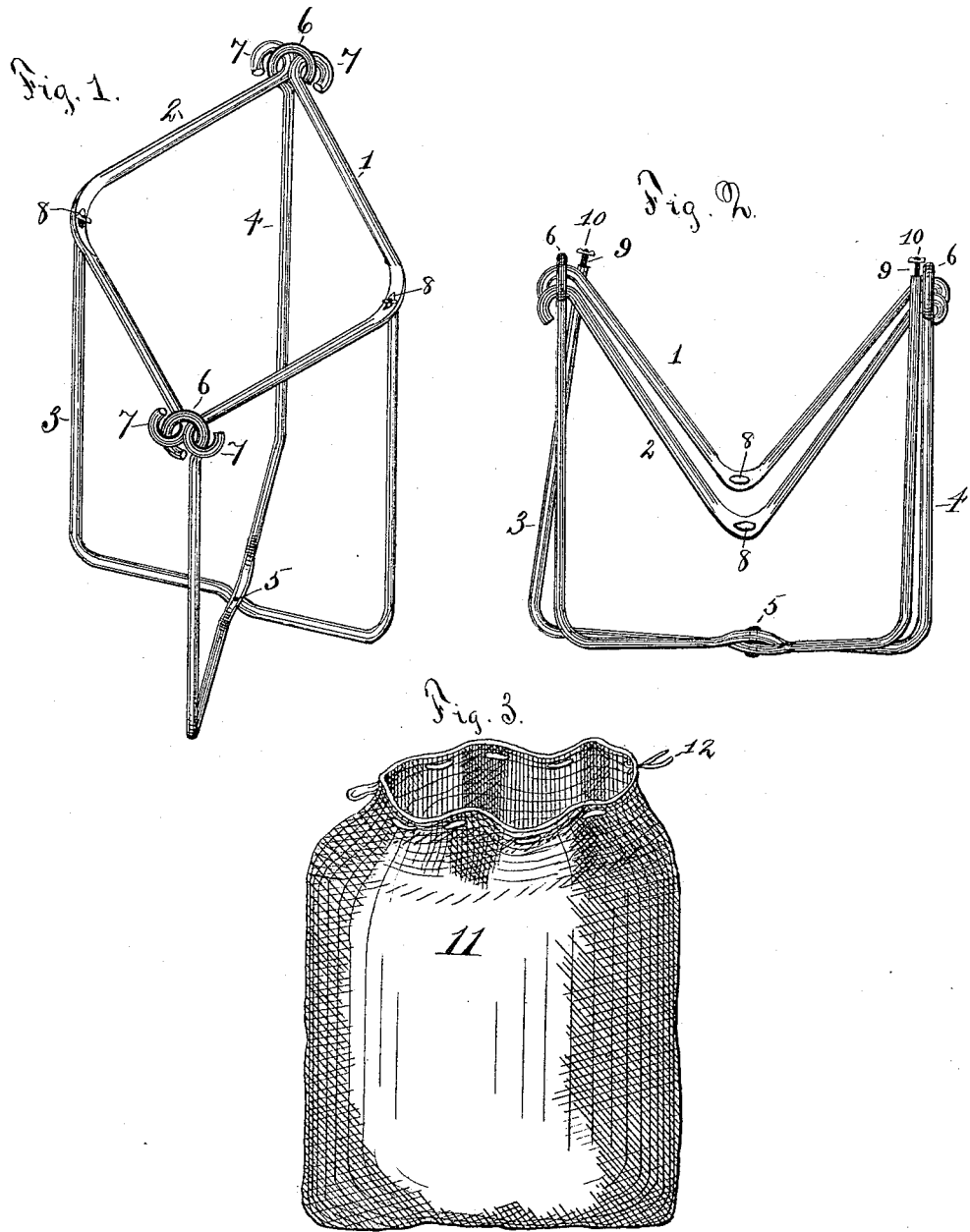
Witnesses.
Inventor.
Jno. W. Walker
by his Atty J S. Duffie

UNITED STATES PATENT OFFICE.

JOHN W. WALKER, OF FLORENCE, ALABAMA.

COTTON-BASKET.

SPECIFICATION forming part of Letters Patent No. 338,892, dated March 30, 1886.

Application filed July 23, 1885. Renewed March 6, 1886. Serial No. 194,356. (No model.)

*To all whom it may concern:*

Be it known that I, JOHN W. WALKER, a citizen of the United States, residing at Florence, in the county of Lauderdale and State of Alabama, have invented certain new and useful Improvements in Cotton-Baskets; and I do hereby declare the following to be a full, clear, and exact description of the invention, such as will enable others skilled in the art to which it appertains to make and use the same.

My invention has relation to cotton-baskets; and it consists of the combination of a wire frame and an ordinary cotton-sack, constructed and arranged as hereinafter described.

In the accompanying drawings, Figure 1 is a perspective view of the wire frame. Fig. 2 is a side view of the frame folded. Fig. 3 is a view of the cotton-basket complete.

My invention is described as follows: I procure pieces of heavy wire, cut them into the required lengths, and bend them in the proper shape, 1 2 3 4, as shown in Fig. 1. Before putting these various pieces together I first flatten the wires 3 and 4 about the middle of the bottom, and bend them slightly, so that the basket may set firm when in position. The said wires are then fastened together at their center by a pivot, 5, which allows the sides to be brought together or to be placed at right angles, as when set for use. On the top of each of the perpendicular sides of the piece 4, I turn a circular hook, 6, through which I bring the ends of the wires 1 2, and also turn on these ends circular hook, 7, thus enabling them to grasp and hold in the rings 6 on the top of the said wire 4. Near the middle of the two wires 1 2, I make a flat place, through which I cut a slot, 8. I also bend the said wires to such an angle that when they are put in position they will form a square top. On the top of the side wires, 3, I form a neck, 9, on which I secure a button, 10.

When I wish to use this frame, I move the side wire, 3, around until it is at right angles to the wire 4. I then slip the buttons 10 and necks 9 through the slots 8, and turn the said buttons until they rest across the said slots, thus preventing the top wires, 1 2, from slipping off of the pin or neck. Thus I have a light stiff frame, over which I draw an ordinary sack, 11, such as may be used for gathering cotton in, and having a draw-string, 12. By tightening said draw-string the sack is held from slipping down.

When I wish to pack away the frame, I withdraw the necks 9 and swing the sides 3 4 together, and let the top wires, 1 2, fall down, as shown in Fig. 2, thus enabling me to store the frame in a small compass.

Having described my invention, what I claim as new, and desire to secure by Letters Patent, is—

1. The combination of the wires 1 2, having the slots 8 and circular hooks 7, with the wire 3, pivoted at its middle to the middle of wire 4 by pivot 5, its upper end having the necks 9 and buttons 10, which fit into the slots 8 of wires 1 2, and wire 4, having the circular hooks 6, grasping the circular hook 7, substantially as shown and described.

2. A cotton-basket consisting of the wires 1 and 2, having the slots 8 and circular hooks 7, wire 3, pivoted at its middle to the middle of wire 4 by pivot 5, its upper ends having necks 9 and buttons 10, fitting into slots 8 of said wires 1 and 2, and wire 4, having circular hooks 6, grasping the circular hooks 7, in combination with the sack 11, having drawstring 12, said sack fitting around said wire frame, substantially as set forth.

In testimony whereof I affix my signature in presence of two witnesses.

JOHN W. WALKER.

Witnesses:
E. G. YOUNG,
P. M. HARAWAY.